(12) United States Patent
Bell

(10) Patent No.: US 9,014,524 B2
(45) Date of Patent: Apr. 21, 2015

(54) ISOTOPICALLY ALTERED OPTICAL FIBER

(71) Applicant: James Dalton Bell, Vancouver, WA (US)

(72) Inventor: James Dalton Bell, Vancouver, WA (US)

( * ) Notice: Subject to any disclaimer, the term of this patent is extended or adjusted under 35 U.S.C. 154(b) by 0 days.

(21) Appl. No.: 14/310,106

(22) Filed: Jun. 20, 2014

(65) Prior Publication Data

US 2015/0023644 A1    Jan. 22, 2015

Related U.S. Application Data

(63) Continuation of application No. PCT/US2012/023551, filed on Feb. 1, 2012.

(51) Int. Cl.
| | |
|---|---|
| *G02B 6/028* | (2006.01) |
| *C03C 13/04* | (2006.01) |
| *C03C 3/04* | (2006.01) |
| *G02B 6/02* | (2006.01) |
| *G02B 6/12* | (2006.01) |

(52) U.S. Cl.
CPC ............... *C03C 13/046* (2013.01); *C03C 3/04* (2013.01); *G02B 6/02395* (2013.01); *G02B 6/028* (2013.01); *C03C 2213/00* (2013.01); *G02B 2006/12061* (2013.01)

(58) Field of Classification Search
USPC ................................................. 385/123–124
See application file for complete search history.

(56) References Cited

U.S. PATENT DOCUMENTS

| | | | |
|---|---|---|---|
| 3,933,454 A | 1/1976 | DeLuca | |
| 4,435,040 A | 3/1984 | Cohen et al. | |
| 5,917,195 A | 6/1999 | Brown | |
| 6,128,928 A | 10/2000 | Antos et al. | |
| 6,490,399 B1 | 12/2002 | Heitmann et al. | |
| 6,810,197 B2 | 10/2004 | Allan et al. | |
| 6,870,999 B2 | 3/2005 | Allan et al. | |
| 2003/0002834 A1 | 1/2003 | Brown et al. | |
| 2003/0039865 A1 | 2/2003 | Kelsey et al. | |

FOREIGN PATENT DOCUMENTS

| | | |
|---|---|---|
| DE | 19716869 A1 | 10/1998 |
| JP | 58197419 | 5/1985 |
| JP | S60(1985)-090845 | 5/1985 |
| JP | 2001-520763 A5 | 10/2001 |
| WO | PCT/EP98/02119 | 10/1998 |
| WO | PCT/2012/023551 | 4/2013 |

OTHER PUBLICATIONS

Berezin, Alexander A., "Total internal Reflection on isotopic interface: a case for isotopic fiber optics", J. Opt. Soc. Am. B, vol. 5, No. 3, Mar. 1988, pp. 728, 729.
Berezin, Alexander A, & Ibrahim, Ahmad M., Semiempirical model of isotopic shifts of the band gap, Physical Review B, vol. 43, No. 11, pp. 9259-9261, Apr. 15, 1991.

*Primary Examiner* — Eric Wong
(74) *Attorney, Agent, or Firm* — Norton R. Townsley; Belasco Jacobs & Townsley, LLP

(57) ABSTRACT

An optical waveguide having a cladding layer formed of high-purity glass, or a cladding layer formed of high-purity isotope-proportion modified glass, and with a core of high-purity isotope-proportion-modified glass with the index of refraction of the core glass greater than the index of refraction of the cladding glass, said high-purity isotope-proportion-modified core material having a Si-29-isotope proportion at most 4.447% Si-29 (atom/atom) of all silicon atoms in said core, or at least 4.90% of Si-29 (atom/atom) atoms in said core, or having a Ge-73 isotope proportion of at most 7.2% Ge-73 (atom/atom) of all germanium atoms in said core, or at least 8.18% of Ge-73 (atom/atom) of Germanium atoms in said core region.

24 Claims, 6 Drawing Sheets

1. O16 core / O16 clad ——
2. O18 core / O18 clad ·······
3. O16 core / O18 clad - - -
4. O18 core / O16 clad — —

1. O16 core / O16 clad ——
2. O18 core / O18 clad ·······
3. O16 core / O18 clad - - -
4. O18 core / O16 clad — —

1. O16 core / O16 clad ———
2. O18 core / O18 clad ·······
3. O16 core / O18 clad ----
4. O18 core / O16 clad —··—

1. O16 core / O16 clad ———
2. O18 core / O18 clad ·······
3. O16 core / O18 clad ----
4. O18 core / O16 clad —··— total ———
modified total ———
infrared absorption —·—
modified infrared absorption ------
Rayleigh scattering ----

ISOTOPICALLY ALTERED OPTICAL FIBER

CROSS REFERENCE TO RELATED APPLICATIONS

This application is a continuation of PCT Patent Application No. PCT/US12/23551, filed Feb. 1, 2012, which claims the benefit of U.S. Provisional Application No. 61/582,099 filed 30 Dec. 2011. The entire, specification, drawings and claims of these applications are hereby incorporated herein by reference.

BACKGROUND OF THE INVENTION (1) Field of the Invention

This invention generally relates to an isotopically altered optical fiber, and is specifically concerned with a silica fiber either depleted of or enriched with Si-29 isotope atoms, or depleted of or enriched with Ge-73 isotope atoms. (2) Description of the related art including information disclosed under 37 CFR 1.97 and 1.98.

Optical loss is a limiting factor in the design and construction of optical networks and links, which typically include hundreds of kilometers of silica-based optical fiber. Optical losses in silica fibers are predominantly caused by two factors: (1) Rayleigh scattering, which falls off as a function of $1/\lambda 4$ (where $\lambda$ is wavelength) and which dominates for shorter wavelengths; and (2) infrared absorption by the silica, which dominates for longer wavelengths. Typical germania (GeO2) doped silica-core fibers have losses of 0.189 db/km to 0.200 db/km. between 1510 nm and 1610 nm.

There was a previous attempt to develop an optical fiber with lower transmissivity losses by means of isotopically altering the fiber regions. See U.S. Pat. Nos. 6,810,197 and 6,870,999. The improvement in loss was limited to about 0.145 to 0.155 db/km, and was accomplished primarily by shifting the wavelength of minimum optical loss to about 1670 nm, and partly by changing the index-of-refraction dopant from germania to Oxygen-17, although the inventors may not have recognized the reason for the reduction in loss due to their use of Oxygen-17.

Fiber-optic scientists and engineers have not recognized that Si-29 isotope is the source of nearly all of the variation of index of refraction of silica from 1.0000, with natural-isotope-proportion Oxygen-17 providing a minor increase at normal (natural) levels. Likewise, such scientists and engineers have not recognized that the Ge-73 isotope (the dopant which, is normally used) increases the index of refraction of fused silica in its natural isotopic proportions, from 1.46 to about 1.47. It is also not recognized that it is the Si-29 dopant which is responsible for the large majority of Rayleigh scattering present in existing-technology optical waveguides. They do not the Si-29 as a dopant since is a naturally occurring stable isotope of silicon.

Thus, a reduction in Si-29 isotopic proportion in silica of, say, a factor of 100 (from nature's 4.67% atom/atom to 0.0467% atom/atom) will result in a material with an index of refraction of 1.005, and a reduction by a factor of 33 will result in a material with an index of refraction of 1.015. These two materials, with a difference in index of refraction of 1.015−1.005=0.010, are well within the right range to become the cladding, and core, respectively, of a new fiber.

Similarly, U.S. Pat. No. 6,490,399 describes the substitution of silicon-30 for silicon-28 isotope, which has a similar effect of moving to the right of the graph the intrinsic IR absorption line. This results in opening up a new region of useable transmission. See FIG. 2 showing a region labeled "B" from about 1610 through about 1710 nanometers wavelength, for the substitution of both Si-30 for Si-28, and O-18 for O-16.

U.S. Pat. No. 6,810,197, in its "Summary of the Invention" (column 1, line 58 to column 3, line 14) describes a reduction in the number of needed amplification stations for a cross-Atlantic link, by 11 units, due to an increase in the possible inter-amplifier spacing from 125 kilometers to 156 kilometers. This benefit is almost certain to be illusory in practice, however. Any practical link that transmits from 1610 through 1710 will also be designed to employ the 1510-1610 band, and the isotopic substitution will not appreciably assist the fiber's transmission in most of the 1510-1610 nm band. Since the same amplifier station that amplifies the 1610-1710 band will also be the one to amplify the 1510-1610 band, proper operation on the latter band will require maintenance of the same 125 kilometer inter-amplifier spacing as is currently required. Thus, the only useable improvement will be a broadening of the useable bandwidth on which signals may be sent. In other words, substitution of Si-30 for Si-28 and O-18 for O-16 does not actually enable any savings due to reduction in waveguide loss, and even the widened band (including the 1610-1710 region) is likely to be beneficial only in links in which wavelength division multiplex (WDM) signals already occupy all of the 1510-1610 bandwidth.

Similarly, the reference in U.S. Pat. No. 6,490,399 to Patent Abstracts of Japan, JP-A-60090845, describes a method of employing a deuterium rinse of the porous SiO2 preform to replace existing —OH groups with —OD groups, thus shifting their absorption bands (including 1400 nm) to much longer wavelengths—longer than 1710 nm. Yet, that technology is described as "costly", in part because fiber manufacturers have already done a good job of reducing —OH content, in part by continual improvement of the C12 treatment which was described in U.S. Pat. No. 3,933,454, columns 7, line 1 to 8, line 68.

However, this merely means that the —OH absorption spectrum, especially at 1400 nm, see FIG. 2, is sufficiently low compared to the "Rayleigh Scattering" minimum line, see FIG. 3, so as to make further improvement seemingly without benefit. The instant invention, by means (in part) of reducing Si-29 concentrations by large amounts, up to a factor of 50-100 or more, has the effect of greatly reducing the altitude of the "Rayleigh Scattering" minimum by a large, related amount, which will enable extra utility for a deuterium (D2) rinse as was described in

JP-A-60090845.

Therefore, an embodiment of the instant Si-29-reducing invention will likely have further unanticipated benefits from both a deuterium (D2) rinse, as well as a substitution of Si-30 for Si-28, or a substitution of O-18 for O-16, or both. A full implementation of these modifications may result in an optical waveguide that has a transmission bandwidth from at least 1230 nm to about 2000 nm at a loss of about 0.01 db/km or lower, and so can achieve trans-Atlantic transmission with no or, at most, one amplifier station.

This attempt shifted the line representing "IR Absorption" (see FIGS. 4 and 5) to the right on these graphs. This had the effect of reducing the minimum absorption, caused by the sum of "IR absorption", "Rayleigh [scattering]", and "UV" to be slightly lowered, with the resulting transmission bandwidth somewhat broadened.

The instant invention, however, attacks not only the "IR Absorption" line, but in fact also the "Rayleigh Scattering" line. See FIG. 10, long-hatched line, labeled "Rayleigh scattering."

A reduction in the quantity of Si-29 scattering centers by a factor of "X" will reduce the altitude of the "Rayleigh scattering" line by a factor within the range of "X" and the square-root of "X". This will result, for a factor of 33 reduction, in Si-29 concentration, in between a factor of 33 and the square root of 33 (about 5.9) reduction in attenuation due to Rayleigh scattering effects. This dramatically reduces the overall attenuation seen in the 1310 nm band, as well as in wavelengths up to approximately 1650 nanometer.

Of course, a combination of a portion of the features of U.S. Pat. No. 6,810,197, the substitution of O-18 for O-16 in both the core and regions of the cladding near the core, and the dramatic reduction in Si-29 isotope proportion down to and through a factor of 100 reduction (to 0.0467% of Si-29 atom/atom) combines to cause a remarkable reduction in overall attenuation due to the signal's passage through the optical waveguide.

The authors of U.S. Pat. No. 6,810,197 were under the impression that at least some O-17 isotope was necessary to provide useful benefits, co-substituting with Oxygen-18 for the majority of Oxygen-16 that would ordinarily be present in non-isotopically-modified fiber. See, for examples, Claims 1, 3, 4, and 9 in U.S. Pat. No. 6,810,197.

In contrast, this instant invention specifies the presence or absence of a 0-17 isotope, but in proportions sufficiently lower than to overlap the claims of U.S. Pat. No. 6,810,197 or other patents or applications.

Persons familiar with the art of fiber optic waveguide design, i.e. fiber optic scientists and engineers, will be able to define, for a given transmission wavelength and core diameter, the necessary index of refraction difference for it to function as a single-mode transmission medium, or alternatively as a multi-mode transmission medium.

The fused silica index of refraction may be adjusted from the natural-isotope-distribution value of about 1.46, to virtually any value down to 1.0000, depending on the reduction in the proportion of Si-29 isotope achieved. So, the example above of the indices of refraction being 1.015 and 1.005 is exemplary and without limitation.

U.S. Pat. No. 6,128,928 describes the anti-free-oxygen benefits of a small doping of germanium oxide added to the cladding or inner-cladding region of an optical fiber. In that context, however, the index-of-refraction-raising effect of the Ge-73 isotope (which the author of U.S. Pat. No. 6,128,928 does not recognize as the very large majority of the source of the index-of-refraction-raising-effect) is a drawback. The inventor of the instant invention, instead, specifies the addition of ONLY (or a large majority) of Germanium atoms other than Ge-73 isotope atoms, in order to obtain the same benefit of U.S. Pat. No. 6,128,928 without raising the index of refraction. The author of the U.S. Pat. No. 6,128,928 patent clearly did not anticipate the possibility that an isotopically-modified sample of germanium oxide could be used, instead of a natural-isotope sample.

The Inventor of the instant invention was familiar with the principles of optics and of waveguides, having taken a Physics course numbered '8.03' at MIT in the fall of 1977.

In early 2007, the Inventor had the opportunity to read a 1979 book on the very highly technical aspects of optical-fiber construction and use. In November/December 2008, the Inventor had the opportunity to read Corning Glass Works v. Sumitomo Electric U.S.A., both the district court case at 671 F. Supp 1369 (S.D.N.Y. 1987) and the Federal Circuit appeal case at 868 F.2d 1251 (Fed.Cir. 1989). This provided a very extensive discussion of the history of optical-fiber research and details as to its construction and design.

The Inventor also happened to obtain a list of naturally-occurring isotopes of each element, about 256 in total. Silicon consists of about 92% Si-28, 4.67% Si-29, and 3.1% Si-30. Germanium is about 7.8% Ge-73. A given nucleide (an isotope's nucleus) possesses a property called 'spin' (actually, 'electromagnetic spin') if it had either an odd number of protons or an odd number of neutrons. Thus, of silicon's isotopes, only the Si-29 (4.67% atom/atom) had 'spin', and only the Ge-73 (7.8% atom/atom) had 'spin'.

'Spin' may be thought of as a permanent wobble caused by the fact that there remains a single, unpaired nucleon present. It causes a vibration of the (positively charged) nucleus, making that nucleus behave something like a tiny bar-magnet. This spin could is used in Nuclear Magnetic Resonance analysis, most commonly with Hydrogen-1 atoms, and in Magnetic Resonance Imaging. Isotopes are also used, occasionally, as 'tracers', to follow the mechanism of chemical reactions.

By reading the Corning case, the Inventor knew that the addition of about 8% (weight/weight) of Germania (Ge02) to silica (Si02) had the effect of raising the index of refraction of pure silica (at 1.4584) to about 1.466. But why, the Inventor wondered, did it do so? It occurred to me that since the silicon atoms were only 4.67% spin-containing, and the replacement germanium atoms were 7.8% Ge-73, the Inventor thought that maybe the presence of electromagnetic spin-containing atoms was the underlying reason that materials even have an index of refraction greater than that of air or a vacuum (1.000), and it turns out that the Inventor was right. Even then, the Inventor understood that the Inventor did not know if a given Ge-73 atom had a greater effect, overall, on index of refraction than a Si-29 atom, but that was a question that the Inventor could not then answer.

But, the realization that Si-29 may be the underlying reason that silica has an index of refraction over 1.000 led to a number of ideas in quick succession:

1. You could add Si-29 to silica, rather than adding Ge02 to silica, to increase its index of refraction over that of the cladding region.

2. You could decrease the proportion of Si-29 isotope atoms in the cladding region, rather than increasing them in the core, and 2 thus produce the differential in index of refraction necessary to 2 have a functioning optical waveguide.

Either of these ideas is interesting, but they would only have provided a small increase in benefit for the optical-fiber manufacturing industry. Either idea would slightly reduce the optical loss over germania-doped optical fibers, but in both cases the velocity factor would remain close to the 68% of c characteristic of existing optical fibers.

The big question was: how low could the index of refraction of the core and cladding be brought down and the core and cladding still function as a waveguide? As far as is known, the only limit was that it was impossible to lower the index of refraction of the cladding material to a value of 1.0000, the same value as a vacuum. And, with such a cladding, the core would probably have to have an index of refraction about 0.008 larger, and thus it would be 1.0080.

The resulting fiber would have a velocity factor of 1/1.008, or 99.2% of c. The Inventor realized that would be very valuable for users of fiber optics to be able to accelerate the signals from the existing velocity factor of 0.68 to near 0.99. The Inventor was not aware of the invention of an optical fiber with a velocity factor of 98-99% of c.

But this was not surprising since there is little need for isotopes of various elements and thus science and industry only rarely attempt to separate isotopes of the same element.

In the field of Chemistry, tracer (stable) isotope-tagged chemicals are sometimes used to analyze chemical reactions Three patents were granted in the early-2000 time frame, one to Deutsche Telekom and two to Corning, on the very subject of stable-isotope enhancement. But the only isotopic ratios they were talking about modifying were Si-28 versus Si-30, or O-16 versus O-18, and to a smaller extent O-16 versus O-17. Si-29 simply was not considered.

The mechanism to generate the necessary isotopically-modified precursor (SiCl4; silicon tetrachloride) already exists. See the "Silicon Kilogram Project" (Google "Silicon Kilogram Sphere"). They separated the silicon-containing precursor (which was probably either silane (SiH4) or silicon tetrafluoride (SiF4)), in Russian gas centrifuges, and converted it into single-crystal silicon later. Instead, the instant invention requires the silane or silicon tetrafluoride turned into SiCl4, which can be directly used as input to the optical-fiber manufacturing process of the same type that Corning patented in 1976.

Development of an optically transmissive material and a waveguide which has much reduced index of refraction represents a great improvement in the optical arts and satisfies a long felt need of the optical engineers.

SUMMARY OF THE INVENTION

This invention is an isotope-modified version of Silica (SiO2) that has an index of refraction of anywhere below nature's value of 1.4584. This means that natural-isotope-proportion silica transmits light at a speed of (1/1.4584) that of c, where c is defined as the speed of light in a vacuum. (A vacuum has an index of refraction of 1.0000 exactly, by definition.) The speed of light in a vacuum is about 299,700 kilometers/second. Light travels through air at about 0.999 c. The graph shown in FIG. 1 is from the 1989 issue of Encyclopedia Britannica, Macropedia, Volume 23, pages 665-666. The thinnest, darkest region shown represents optical glasses that were available in 1880. You can see that no known glasses were available in 1880 with an index of refraction below about 1.45. By 1934, the technology had advanced to a point (see un-shaded region labeled "ordinary optical") which included glasses with as low an index of refraction as 1.40.

The rest of the graph (light-tinted) shows various kinds of glasses "developed since 1934". Of these, the "fluophosphate" and "fluoride" glasses include regions with an index of refraction of about 1.32. The reason that currently available glasses do not have an index of refraction much below 1.4584 is that, by and large, they are made with natural-isotope-proportion silica. In other words the amount of Si-29 they contain is nature's 4.67% of all silicon atoms, (atom/atom). The inventor has discovered that it is almost entirely the Si-29 (and, to a much smaller proportion, the O-17) which is responsible for the fact that the index of refraction of Silica is greater than 1.0000. Scientists and engineers do not realize this, because they virtually never see isotope-proportion-modified materials. The silica they see always has a Si-29 proportion of 4.67%, atom/atom. Silica with an index of refraction of 1.02 can be made if it has an isotope-proportion of 0.20% Si-29, atom/atom. Silica with an index of 1.01 can be made if it has an isotope proportion of 0.10% Si-29, atom/atom, etc. The effect is not precisely linear: these values were selected for purposes of illustration.

More particularly, the instant invention relates to an optical waveguide comprising silica which is present in an isotopic proportion varied in, and usually heavily depleted of, the silicon isotope Si-29. A dramatic reduction of the isotopic proportion of Si-29, from the 4.67% (atom/atom) usually found in nature, by a factor of about 50× (to about an isotopic proportion of 0.093% Si-29) will result in a fused silica with an index of refraction of approximately 1.010. This contrasts with the index of refraction of 1.46 present in natural-isotope-proportion fused silica. It is the object of this invention to provide an optical waveguide with specific improvements in waveguide performance, including:

1. Signal velocity factor settable to a value far above the 0.67 value normally associated with silica with an index of refraction of 1.46 (1/1.46=0.67). This velocity factor should be adjustable up to at least 0.995, meaning that the optical signals will traverse the core region at a velocity of 99.5% c. Light travels through pure water at about 0.750 c. Light travels though ordinary types of glass at about 66% c. Thus, data signals will be able to travel about 1.5 times faster than in ordinary, conventional-technology optical fibers.

2. A very large reduction in optical loss from the 0.191-0.200 db/km usually seen in germania-doped silica fibers, and also from the 0.160 db/km typically seen in un-doped core silica fibers. This reduction will be at least a factor of 5, and perhaps well over a factor of 50 with all isotope-modifications having been added. If the latter value is achieved, and thus a loss value of 0.0032 db/km is achieved, then fiber signals could be transmitted across the Atlantic Ocean with two, one, or even NO intermediate re-amplification. This reduction of Rayleigh scattering would cover most of the 500 nm-1650 nm band.

3. Large reductions in chromatic dispersion and pulse-broadening, commensurate with the reduction in optical loss, to include most of the visible wavelengths of 400-700 nm, as well as most of the infrared wavelengths of 700-1650 nm.

In one embodiment, a reduction of index of refraction of the cladding to about 1.005 would be combined with an index of refraction of the core at 1.015, resulting in a velocity factor of about 0.985, meaning that the data signals would travel at a velocity of about 98.5% light travelling in a vacuum. The difference in index of refraction between the core and cladding in this specific embodiment is achieved by at least four mechanisms:

1. Reduction in the isotopic proportion of Si-29 in the core region silica to about 4.67%/30, while changing the isotopic proportion of Si-29 in the cladding region to about 4.67%/100.

2. Reduction in the isotopic proportion of Si-29 in both the core and cladding regions to about 4.67%/100, while adding some Ge-73 isotope (or a larger proportion of natural-isotope germania) to increase the index of refraction to 1.015.

3. Reduction in the isotopic proportion of Si-29 in both the core and cladding regions to about 4.67%/100, while adding a proportion of Oxygen-17 isotope atoms, above the proportion of 0.038% found in nature, sufficient to raise the index of refraction of the core to a level sufficient to maintain proper waveguide action.

4. Reduction in the isotopic proportion of Si-29 in both the core and cladding regions to about 4.67%, while adding to the core region amounts of both Oxygen-17 isotope and Germanium-73 isotope (or both Oxygen-17 isotope atoms and some germania containing a significant isotopic proportion of Germanium-73) sufficient to raise the index of refraction of the core to a level sufficient to maintain proper waveguide action.

In another embodiment, the index of refraction set points for the core and cladding regions are set to different values, but maintain the relationship so that the difference functions to perform the actions of a waveguide. They may be set, for example, to a core index of refraction of 1.04 and a cladding index of refraction of 1.03.

This choice reduces the requirement for purifying an isotopic sample of precursor material. The core region need only be made of silicon atoms reduced in Si-29 content to a factor of 12 times lower than the 4.67% atom/atom found in natural samples, whereas the cladding region need only be made of silicon atoms reduced in Si-29 content to a factor of 17 lower than 4.67% atom/atom of Si-29 isotope atoms.

In yet another embodiment, both the core and cladding regions are constructed almost entirely of germania (GeO2) which has been isotopically-modified to reduce the normal proportion of Ge-73 isotope atoms by a factor of 100 and 300, respectively (7.8%/100 and 7.8%/300 atom/atom, respectively, analogous to item 1, above). Similarly, in another embodiment, both the core and cladding regions are constructed almost entirely of germania which has been isotopically modified to reduce the normal proportion of Ge-73 to a factor of 300 lower (7.8%/300) but where the index of refraction of the core is raised by the addition of either a small doping of Si-29 atoms or of O-17 isotope atoms, or both.

In another embodiment, and to reduce the amount of isotopically-modified material which must be employed, the core region is constructed so as to be surrounded, immediately, by an inner cladding region, and then an outer cladding region, with the possibility that the material employed in the outer cladding region will be depleted to a lesser degree in S9-29 isotopes. For example, the core may be set to an index of refraction of 1.015, the inner cladding may be set to an index of refraction of 1.005, and the outer cladding may be made with an isotope proportion of Si-29 (or, alternatively, Ge-73) identical to or closer than to the 4.67% atom/atom (for Si-29) or to the 7.8% atom/atom (for Ge-73) proportions of these species found in natural-isotope proportions found in terrestrial samples. This construction method will tend to minimize the cost of the material employed. Note, however, that in this technique the diameter of the inner-cladding/outer-cladding interface must be sufficiently larger than the diameter of the core/inner cladding interface, to ensure that no more than an acceptable proportion of the light may 'leak' into the outer-cladding region and be lost, thereby increasing the overall attenuation of the fiber. A person skilled in the art of fiber optic engineering and science will be able to mathematically predict, and separately confirm by experiment, that the outside diameter of the inner cladding region is sufficiently larger than the diameter of the core region to lower losses to acceptable levels.

Source of Isotopically-Modified Materials

Silica is derived from silicon-containing precursors depleted in Si-29 isotope atoms. These silicon-containing precursors can be of at least three types:

1) Enhanced in isotopic proportion of Si-28 isotope atoms to approximately 99.5% atom/atom, and depleted in Si-30 isotope atoms to a very small or negligible amount: Such an isotopic distribution can be expected from the output of a gas centrifuge, selecting the light molecules, SiF4 or SiH4.

2) Enhanced in isotopic proportion of Si-30 isotope atoms about to 90% atom/atom or more, and depleted in Si-28 isotope atoms to 10% or less. This would also be a gas-centrifuge output product, selecting the heavy molecules . . . .

3) Depleted in isotopic proportion of Si-29 isotope atoms from the natural proportion of 4.67% atom/atom, but otherwise not greatly varying the relative proportion of Si-28 and Si-30 isotope atoms.

In each of these examples the Si-29 proportion is set to a value calculated to achieve a specific index of refraction for the as-deposited silica material.

For a typical preferred embodiment, employing silica with an isotopic distribution of silicon atoms with about 0.1% Si-29 isotope atoms, the main difference between the 90%+ Si-30 isotope constituency, item 2 above, and the 99.5% Si-28 isotope constituency, will result in a broad pass band for IR signal transmissions at wavelengths in excess of 1600 nm. The specific extent of the broadened transmission spectrum and the loss figures cannot be easily predicted prior to constructing the fibers, but it will be understood that these extra useable frequencies, specifically at losses well under 0.1 db/km, have not been anticipated by prior optical waveguide art. It will also be understood that these extra useable frequencies have not been provided, or foreseen, accompanied by transmissions bands from about 1400 nm which are equally useable due to hyper-low-loss transmissions.

An appreciation of the other aims and objectives of the present invention and a more complete and comprehensive understanding of it may be achieved by referring to the accompanying drawings and studying the following description of the best mode of carrying out the invention.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

Figure 1:
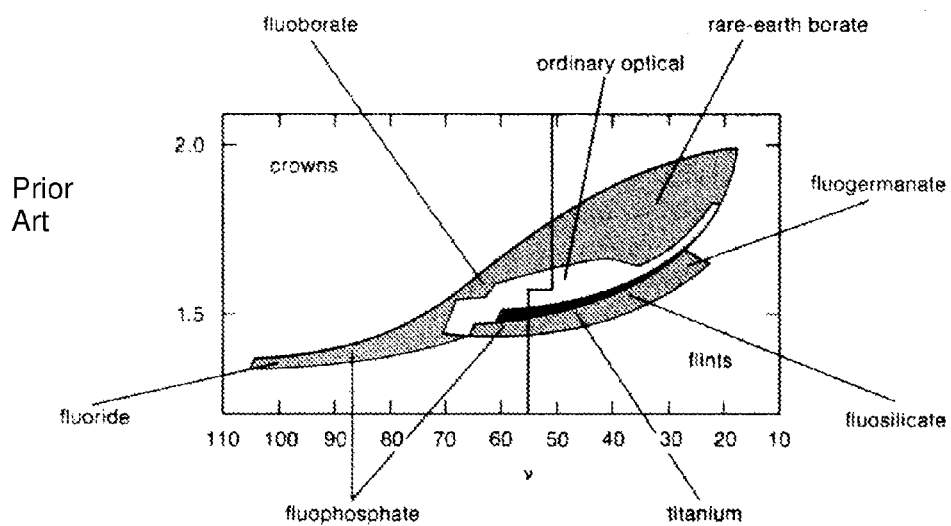
FIG. 1 is a graph of refractive index, n, versus constringency, v, for the range of optical glasses. From Glass in the Modern World by F. J. Terence Maloney, 1968, Doubleday & Company, Inc.
Figure 2:
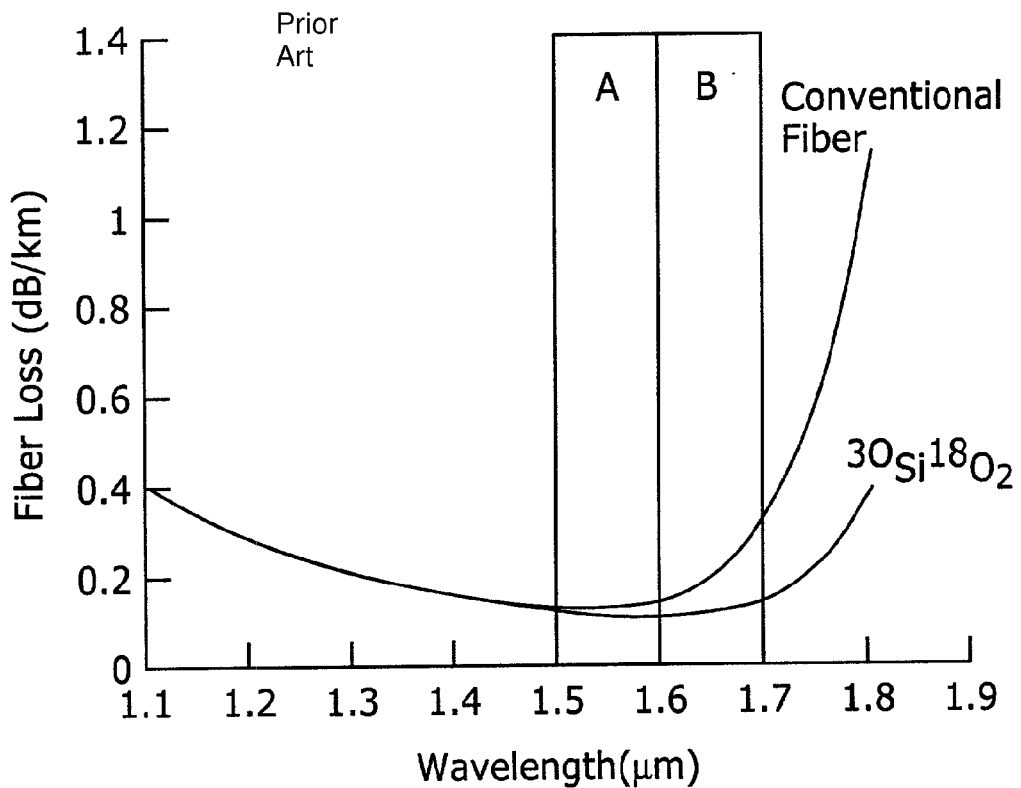
FIG. 2 is a reproduction of Publication 2003/0002834 FIG. 1
Figure 3:
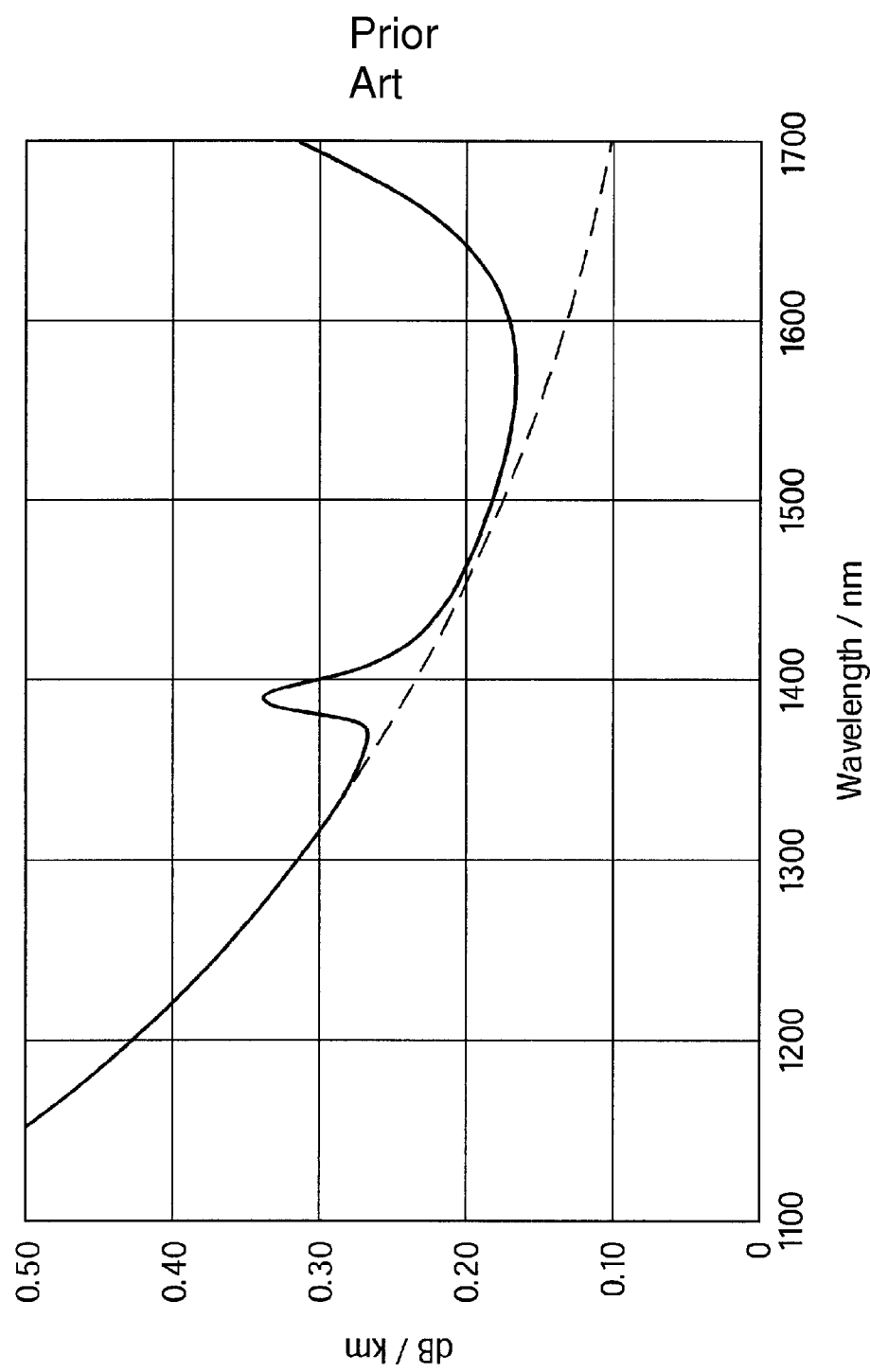
FIG. 3 is a reproduction of U.S. Pat. No. 6,490,399, FIG. 1.
Figure 4:
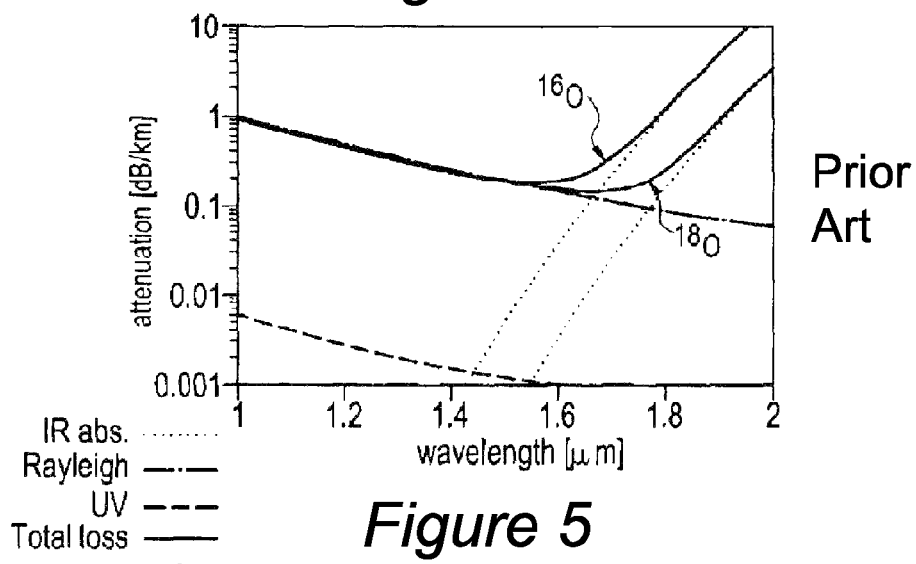
FIG. 4 is a reproduction of U.S. Pat. No. 6,810,197, FIG. 4.
Figure 5:
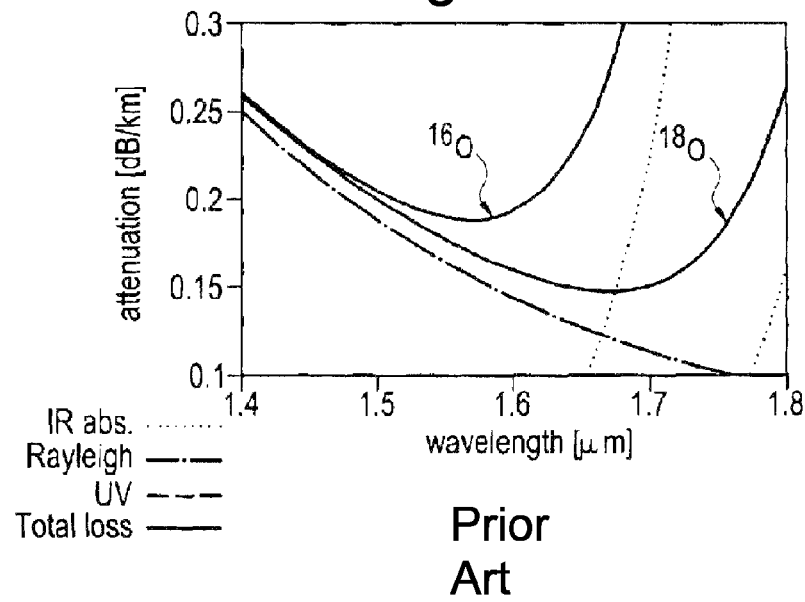
FIG. 5 is a reproduction of U.S. Pat. No. 6,810,197, FIG. 5.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Benefits of the Invention

Due to the availability of glass materials with an index of refraction of as little as 1.001 by reducing the Si-29 content from nature's 4.67% atom/atom to about 0.01%, or even lower, the index of refraction of the core in a waveguide can be approximately 1.001-1.002, and thus the 'velocity factor' of the signals transmitted through that fiber could be at least as high as (1/1.001), or 99.9% c.

Existing optical fiber cables typically employ waveguides that operate with a velocity factor of about (1/1.47), or 68% of 'c'. A signal can be transmitted a distance of about 6,000 kilometers, approximately the cable length between New York and London, within a one-way delay of about 36 milliseconds. Even employing a currently-proposed route designed to be straighter and more direct, a cable distance of 5000 and a one-way delay of 30 milliseconds is the minimum that current technology can provide.

However, converting the fiber to one which has a velocity factor 99.5%, rather than the heretofore typical value of 68%, results in a one-way delay on the longer route of about ⅔ of 36 milliseconds or 24 milliseconds. Use of that faster fiber on the shorter route, which is forecast to have a one-way delay of 30 milliseconds with ordinary cable, will produce a one-way delay of ⅔ times 30 milliseconds, or 20 milliseconds.

This kind of difference in signal delay is extremely important for real-time interactive video, server response, database lookup, Internet gaming, and low-latency telephone communication generally. It also allows database and other servers to be located further away from users for the same delays.

The financial market, such as stock exchanges, will be especially affected. An extra delay of a few milliseconds, each way, could cost a high-volume stock trading firm tens of millions of dollars per month. A reduction by a factor of ⅔ of the delay between New York and London, or between New York and Los Angeles, from 36 milliseconds to 24 or even 20 milliseconds will more closely tie not merely a single country, but ultimately the entire world Internet gaming is another use. Today, two users located in, say, New York and Sydney, Australia, can be locked in (bloodless) digital combat, with their computers only learning 100 milliseconds later what the opponent did. These delays, while seemingly small, are quite perceptible and substantially affect the flow of the games. A reduction of a factor of ⅔, from 100 milliseconds to 67 milliseconds, in the one-way link delay will provide the minimum theoretically-possible delay.

Optical Loss Benefits

It has long been accepted that the minimum optical loss for a pure-silica core waveguide at the loss-minimum of about 1560 nm is 0.151 db/km. This was changed somewhat with the possibility of substitution of Si-30 for Si-28, and substitution of O-18 for O-16. But, improvements to below 0.10 db/km still seem hard to achieve, and are considered expensive.

The instant invention, by reducing Si-29 by factors of 50, 100, or more, reduces optical loss by a factor of 10, and quite possibly a factor of 100 or more. This allows repeater less spans of 5000 kilometer or more to be achieved.

Optical Bandwidth Increase Benefits

The current optical bandwidth, between 1510 and 1610 nanometers, increases, with the instant invention, to at least 1450 nm through 1800 nm, and quite possibly 1230 nm to 2000. While full utilization of some of these wavelengths will await production of suitable transmitter lasers and detectors, a large fraction of this new region of transmission should be available almost immediately. In any case, this new-capacity fiber can be installed immediately, operated at the traditional 1510-1610 band, and the wavebands expanded as the receivers and transmitters become available.

However, there is little value in merely being able to increase the transmission bandwidth of an optical fiber from 1510-1610 nm to include, say, the 1610-1710 nm band, as U.S. Pat. No. 6,810,197 does, without the matching fiber amplifiers which would (if they existed) amplify that extra bandwidth. Fiber amplifiers based on erbium amplify approximately in the region of 1520-1565 nm bandwidth, making this the main transmission region. While it would be possible to detect and re-transmit such signals at each amplifier, this would be expensive and would render nugatory the extra bandwidth. It might be cheaper simply to install extra fibers to achieve a larger capacity.

If, instead, this bandwidth could not only be made available, but also available with a loss of approximately 0.01-0.02 db/km; a far-wider band could be employed, and that even without the use of any fiber amplifiers at all (or, at most, one detection and re-transmission amplifier at approximately the mid-point of the Atlantic.)

The bandwidth that can be used by employing the instant invention runs from about 1430-1750, about 320 nm, seven times wider than the 45 nm of the 1520-1565 nm band, and that would be for using an ordinary isotope distribution of Si-28 vs. Si-30, and O-16 vs. O-18. By employing nearly all Si-30, as well as nearly all O-18, the bandwidth made available increases to 1430-2000 nm, or 570 nm, about 13 times wider than the 1520-1565 nm band.

Dramatically Decreased Material-Sourced Dispersion Factor

A large reduction in the proportion of Si-29 isotope atoms in the waveguide material will result in a commensurate large reduction of the overall dispersion of the as-manufactured optical waveguide. See FIGS. 6 and 7. The portion of the dispersion attributable to the waveguide itself (see FIG. 8) will likely remain the same, and the profile dispersion can be selected to neutralize, any residual overall dispersion that may remain after other isotope modification processes are complete. A person familiar with the art of optical fiber waveguide design will be able to define various substitutions of core versus cladding that will accomplish the desired dispersion level.

Figure 6:
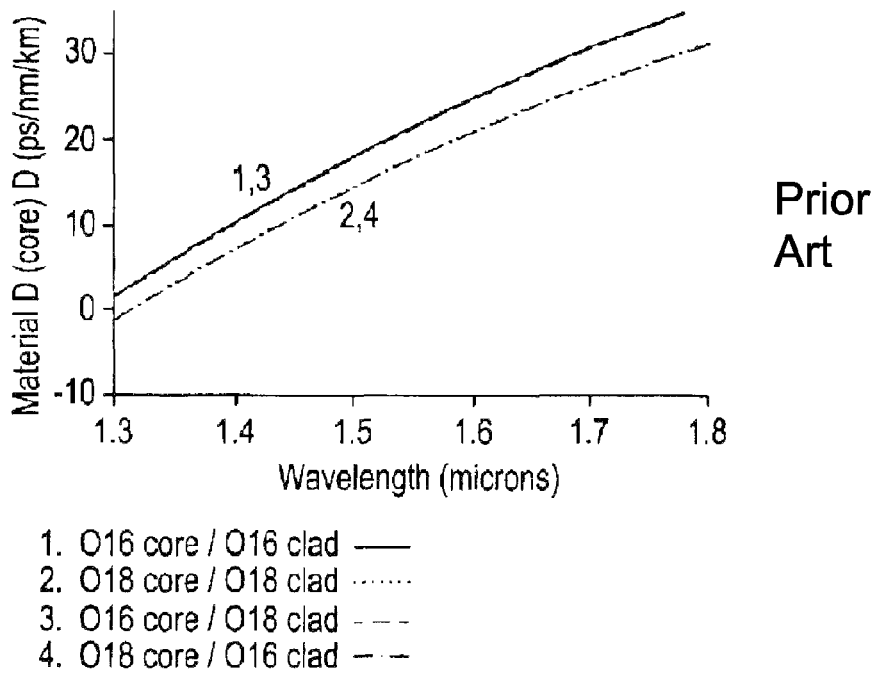
FIG. 6 is a reproduction of U.S. Pat. No. 6,810,197 FIG. 9
Figure 8:
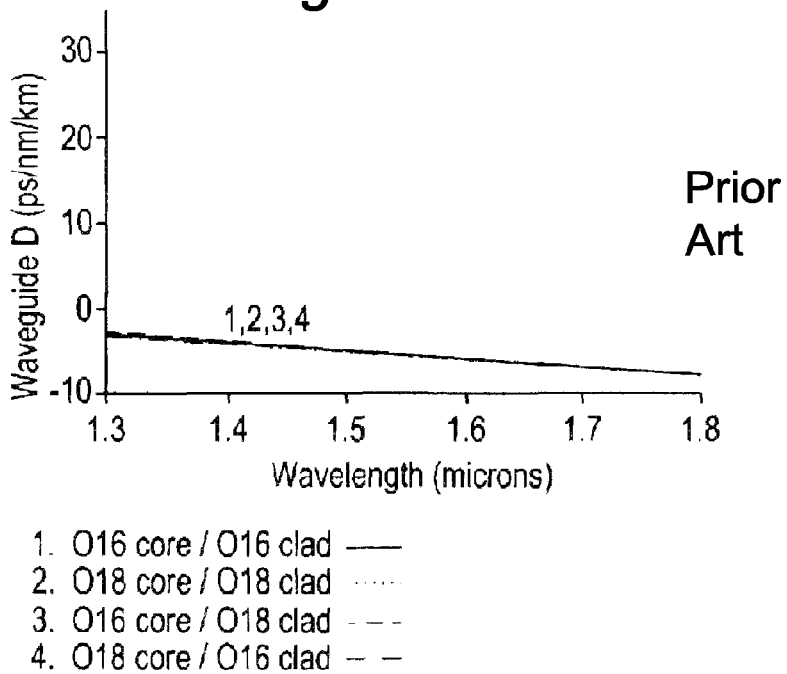
FIG. 8 is a reproduction of U.S. Pat. No. 6,810,197 FIG. 10
Figure 9:
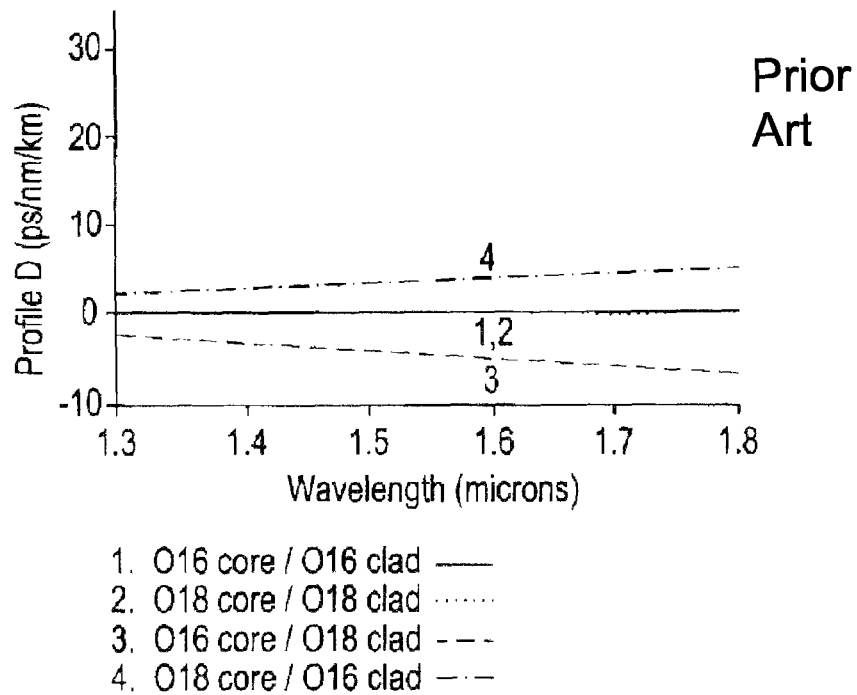
FIG. 9 is a reproduction of U.S. Pat. No. 6,810,197 FIG. 11

This invention contemplates a re-designed optical waveguide, with a large reduction in the isotopic proportion of Si-29 in the core and cladding regions (approximately between 3× and 100× reduction of Si-29 proportion from natural 4.67% atom/atom of all silicon atoms present), which will result in a large change from the curve in the value of "Material D[ispersion] (core)", analogized from FIG. 6, and a much smaller change (if any) in the curve in "Waveguide D[ispersion]", analogized from FIG. 8, Profile D, combined with a "O-8 core/O-16 clad", analogized from FIG. 9.

In other words, the monotonically-rising and straight line of line 4 on FIG. 9 will compensate, in part, for the monotonically-falling and straight line(s) of lines 1-4 in FIG. 8. The residual of the addition of these values may be combined with the Si-29-reduced curve, analogous to FIG. 6, line 4, which can be expected to be of far-lower slope than that in U.S. Pat. No. 6,810,197.

Figure 7:
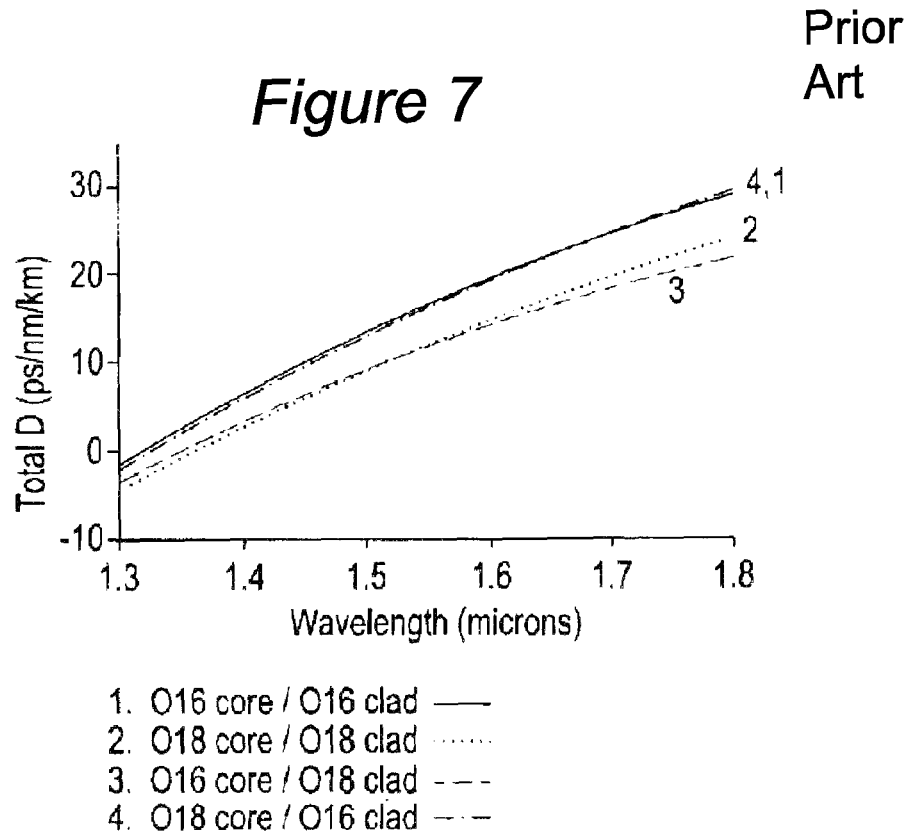
FIG. 7 is a reproduction of U.S. Pat. No. 6,810,197 FIG. 12.
Figure 10:
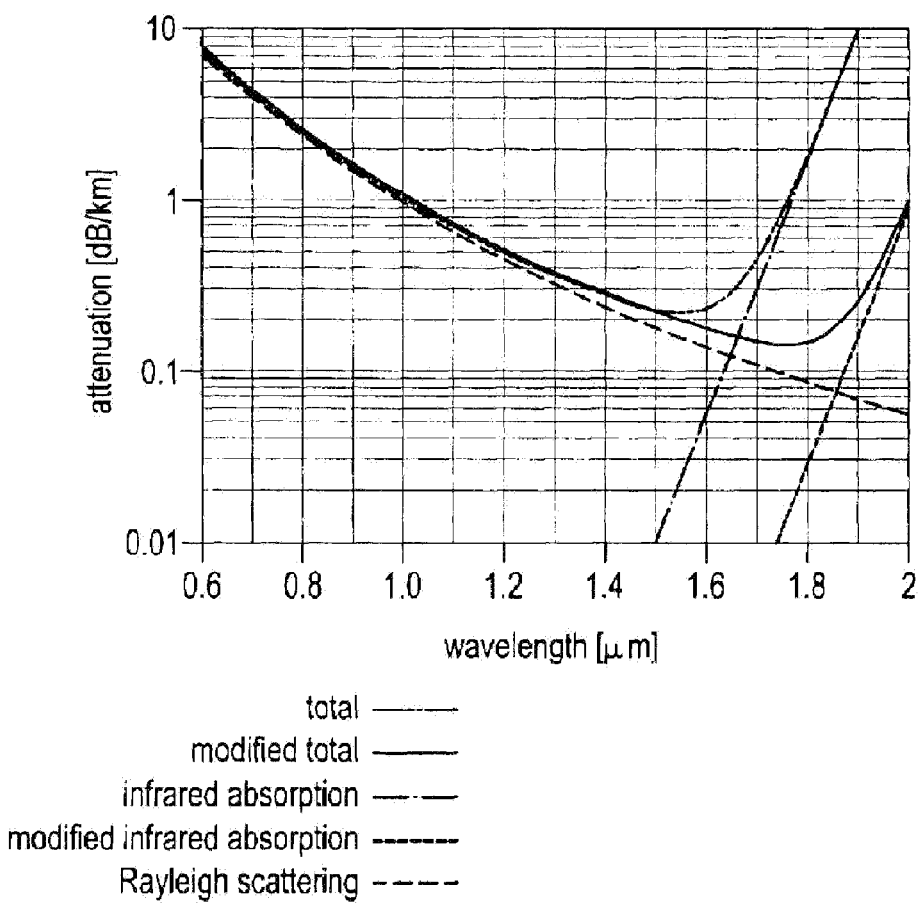
FIG. 10 is a reproduction of U.S. Pat. No. 6,810,197, FIG. 2.

Judiciously selected, the overall dispersion, analogous to the "Total D[ispersion]" of FIG. 7, will be the linear sum of the "Material Dispersion]", the "Waveguide D[ispersion]", and the "Profile D[ispersion]", and may be lower than a value of 1.0 ps/nm/km, which is a very large reduction from the value of about 20 ps/nm/km at a wavelength of 1.6 microns on ordinary-isotope "O-16 core/O-16 clad" which is shown on FIG. 7.

Fiber-optic waveguide scientists and engineers have long been familiar with the need for and use of dispersion-compensating fibers (DCF). The purposes of these fibers, which are used in relatively short lengths (as compared to the hundreds or thousands of kilometers present in typical optical-waveguide links) is to oppose, and thus counteract and fully or partially neutralize, a change in the time of arrival of differing-wavelength portions of a given optical signal. Their use may be critical in order to be able to achieve the maximum bit-rate (technically, symbol rate) that a given actual data-link can carry. The reason is that dispersion tends to blur, in time, the arrival time of transitions of optical signals which make up a given bit.

For example, a symbol-rate of 40 Gbits/sec (40 billion bits per second) implies a bit-time of (1/40,000,000,000)=25 picoseconds, if one bit is present in each optical-signal symbol. This rate, 40 Gbits/sec, is the fastest commercially-available data-rate employed in the most recently-installed (or upgraded) data links. But, it does little good to have an optical detector capable of detecting a 25-picosecond minimum signal time, if that bit (symbol) has been spread in time to, say, 50 picoseconds or more. Since the optical wavelength bandwidth of a 40 Gbit/sec signal will be approximately a minimum of 0.3 nanometers, according to Fourier's Law, an uncompensated conventional fiber with a dispersion of 20 ps/nm/km would add a dispersion-caused blur in time of 25 picoseconds after a fiber length of about four kilometers. It can be seen, therefore, that compensating for this dispersion is essential to allowing the maintenance of 40 Gbits/sec even for short distances of fiber.

While a large fraction of optical-fiber dispersion is currently compensated with dispersion-compensating products, the completeness of any such compensation tends to be limited to less than 100%. Thus, the better the main fiber is (the lower its baseline dispersion), the better the ultimate as-compensated optical link's dispersion can be expected to be. The instant invention's prospect of reducing native, uncompensated fiber dispersion by a factor of 10 times or more provides the prospect of a similar as-compensated improvement in signal dispersion.

Instant Invention May Employ Techniques from U.S. Pat. No. 4,435,040

It is expected that optical waveguides built with this invention will also be able to employ the double-clad process described in U.S. Pat. No. 4,435,040, with certain cautions and modifications. First, it should be remembered that in existing technology waveguides, the core and cladding have indices of refraction very close to that of natural-isotope distribution silica, 1.46. The physical wavelength of the optical signal in such a waveguide is, for example, 1510 nanometers divided by 1.46, or approximately 1050 nanometer. In contrast, in a waveguide whose indices of refraction are about 1.01, the physical wavelength in that waveguide is 1510 nanometers/1.01, or about 1495 nanometers. Since the behavior of the wave within the waveguide is based on the size of the guide compared to that of the optical wave, it is to be expected that dimensions of waveguide components such as the core and cladding will be sized to a factor of about 1.46/1.01, or 1.45, greater than existing-technology fibers, all else being equal.

Where, for example, U.S. Pat. No. 4,435,040 specifies an effective core diameter of greater than 2×4 microns, or 8 microns, this would translate into a core diameter of 8 microns×1:45, or about 11.6 microns. Similarly, where U.S. Pat. No. 4,435,040 specifies about a factor of between 0.5 and 0.8 difference between the radius of the core and the radius of the inner cladding, such factors will operate on 11.6 microns, leading to an OD of the inner cladding of about 23.2 microns and 14.5 microns.

U.S. Pat. No. 4,435,040 also forecasts that the thickness of the outer-cladding region should be between a factor of about 6 and 8 greater than the core radius, or (6-8)×(5.8 microns), or between 34.8 and 46.4 microns, which would make the OD of the outer cladding region 11.6+2(34.8 to 46.6) or between 81.2 to 104.8 microns. Outside the outer cladding region is allowed to be yet another cladding region, possibly with an index of refraction equal to that of ordinary silica, or 1.46.

Another caution is that many patents like U.S. Pat. No. 4,435,040 refer to changes in the percentage of the index of refraction of a material, for example "0.1% to 0.6%" of a value which can be expected to be close to that of natural-isotope silica, or 1.46. This translates into a change of 0.1% times 1.46, or a difference of 0.00146, to 0.6% of 1.46, or about 0.00876.

But when a silica material is isotope-modified to greatly reduce Si-29 content, for example to about 1/100th of nature's 4.67% atom/atom of Si-29, and thus an index of refraction of approximately 1.005, it is not possible to reduce that value (1.005) by 0.00876: The index of refraction of real, homogeneous materials cannot be below that of a vacuum, or 1.0000. Therefore, percentage changes in reference to indices of refraction (such as "0.1% to 0.6%) cannot be employed literally, they must be translated to reflect what was probably intended, a difference in numerical value of the index of refraction above that of 1.000. It can be expected that a person skilled in the art of optical waveguide design can successfully translate principles originally intended for near-1.46-index materials to apply to new materials with indices far closer to 1.00.

Index of Refraction of Fused Silica as a Function of Isotopic Proportion of Si-29 Isotope Atoms As mentioned above, the index of refraction of silica will vary as the isotopic percentage of Silicon-29 is varied from its normal (as found in nature) value of 4.67% atom/atom. In order to calculate the index of refraction of silica for a given proportion of Si-29, the following formula is used:

Index(silica)=SQRT(1+(1.131((percent Si-29 atom/atom)/4.67%)))

Example Table for Index of Refraction of Fused Silica Glass

| ISOTOPIC PROPORTION OF Si-29 ISOTOPE (atom/atom) | INDEX OF REFRACTION OF FUSED SILICA GLASS |
|---|---|
| 4.67% (value found in nature) | 1.46 |
| 0.467% (1/10 of nature) | 1.056 |
| 0.0467% (1/100 of nature) | 1.0056 |
| 0.117% (1/40 of nature) | 1.0140 |

(These figures disregard a small contribution by the Oxygen-17 content to the overall index of fused quartz glass.

The difference in the index of refraction of fused silica with a Si-29 content 1/40 of nature's value, and fused silica with a Si-29 content of 1/100 of nature's value is: 1.0140−1.0056=0.0084

This difference is approximately equal to the index of refraction differences employed by typical single-mode optical waveguides. It follows that an optical waveguide can be constructed with a core region containing pure fused silica with an isotopic proportion of silicon of 0.117% (atom/atom), and a cladding region containing pure fused silica with an isotopic proportion of silicon of 0.0467% (atom/atom). It will be apparent to a person skilled in the art of optical-waveguide design and manufacture that, since independent and precise control over the index of refraction of pure fused silica can be maintained without the addition of any foreign dopants, an optical waveguide designer will have far greater control over the optical characteristics than existed previously.

The most obvious improvement that can be achieved is the construction of an optical waveguide employing a material with an index of refraction of the core of 1.02. The resulting velocity factor will be approximately (1/1.02), or 98% of c. Fibers of this characteristic, when deployed, will dramatically reduce the data-latency involved.

The second improvement, which is somewhat less obvious, is that since Si-29 isotope atoms themselves represent a dopant, and because optical loss is a function of Rayleigh scattering caused by dopant atoms, a reduction in the concentration of Si-29 atoms by a factor of 40 (from the example above) may result in a 40× reduction in optical loss from the value of 0.19 decibels/kilometer typically found in germania-doped-core, silica-clad optical fibers. An optical loss of this magnitude, perhaps to 0.005 db/km, may virtually eliminate the need for optical amplifiers except on the very longest fiber links.

Such a large reduction in the inherent loss of silica may uncover manufacturing flaws and limitations which will have to be corrected, and splicing-loss reduction research will take a new, greater urgency: A splice which loses 0.2 decibel may have seemed reasonable when that was equivalent to 1.0 kilometer of fiber's loss (0.19 db/km), but that will become totally unacceptable when it is seen as the equivalent of 40 kilometers of fiber's loss (40×0.005 db/km).

A third improvement will very likely be a dramatic reduction in the chromatic dispersion of the silica itself, perhaps by as much as a factor of 40× with the 40× reduction of Si-29 isotope content described in the example above. Since the overall waveguide dispersion is a function of the sum of dispersions caused not merely by the material, but also by the geometry of the waveguide itself, it is harder to forecast the overall improvements that could be achieved, but a reduction in the overall dispersion of 10 times in magnitude is plausible. Such an improvement would allow higher symbol-rates (often equal to bit-rates), and could dramatically reduce the need for complex dispersion-compensations that are currently used.

A fourth improvement will be a large broadening in width of useable optical frequencies, especially if all optical losses are subject to the same 40× reduction, commensurate with the 40× reduction in Si-29 proportion in the example described above. Currently the longest-haul data links are limited to wavelengths near 1540 nanometers, but useable regions may extend to perhaps 500 to 2000 nanometers, with limitations around 950 nm and 1.400 nm. Accessory optics and electronics needed to support such a wider bandwidth must become available, but a given installed, fiber may later be used to employ these new wavelength regions.

Examples

An optical waveguide could comprise a cladding layer formed of high-purity optical glass, predominantly of silica or germania or both, and a core region formed of high-purity optical glass, predominantly of silica or germania or both, where either or both of said glasses contain silicon atoms of which less than 4.44% atom/atom are Silicon-29 isotope atoms, or contain germanium atoms of which less than 7.41% atom/atom are germanium-73 isotope atoms, or both.

Each percentage could be a factor of 0.95 of the isotopic proportion of Si-29 and Ge-73 isotope atoms normally found in terrestrial samples of each element.

If this waveguide is constructed of silica least 10% of said oxygen atoms in the core or cladding, respectively, could be Oxygen-18.

An optical waveguide could comprise a cladding layer formed of high-purity optical glass, predominantly of silica or germania or both, and a core region formed of high-purity optical glass, predominantly of silica or germania or both, in which at least 50 mole percent of the oxygen in the core, and/or at least 50 percent of the oxygen in the cladding is Oxygen-18. Additionally, however, the core region and/or the cladding region could contain Oxygen-17 isotope in a proportion of less than 5 atom % of the amount of Oxygen-18 isotope.

An optical waveguide could comprise a cladding layer formed of high-purity optical glass, predominantly of silica or germania or both, and a core region formed of high-purity optical glass, predominantly of silica or germania or both, where wherein at least 70 atom % of the oxygen in the core, or cladding, or both, is Oxygen-18 isotope. Additionally, however, the amount of Oxygen-17 atoms is less than 5 atom % of the total oxygen atom content.

Any of the optical waveguides of Examples 1, 2 further including a dopant in the core, or the cladding, or both. However, there is no requirement that the dopant in the core be identical to the dopant in the cladding nor that they be or present in identical concentrations in the core and in the cladding. The dopant(s) may be germanium in natural isotope proportion, germanium in any non-natural isotope distribution, or Si-29 isotope, or phosphorus, or a combination thereof.

In all the optical waveguides of Examples 1, 2, 3 the volume percent of the region containing SiO2 which is depleted in Si-29, or the volume percent of the region containing GeO2 which is depleted in Ge-73, could be less than 50%.

In the optical waveguide of Example 1, at least 70 atom % of the oxygen in the core could be Oxygen-18, or at least 70 atom % of the oxygen in a region of the cladding adjacent to the core could be Oxygen-18, and the amount of Oxygen-17 could be less than 5 atom % of the total oxygen atom content in those regions, respectively.

In any of the optical waveguides of this invention the core could have a constant or gradient index of refraction.

In any of the optical waveguides of this invention the fiber could be surrounded by an external layer made of glass or plastic.

In any of the optical waveguides of this invention the glass material could include pure or doped germania glass, with the isotopic proportion of Ge-73 isotope reduced to at most 7.2 atom, in either or both of the core and cladding regions.

In any of the optical waveguides of this invention the isotopic proportion of O-18 could be raised in the core region, or the cladding region, or both, to at least 10 atom %, and to at most 100% of the total oxygen isotope atoms present.

In any of the optical waveguides of this invention the Si-29 isotope is present as a dopant in the core, or in the cladding, or both.

In any of the optical waveguides of this invention the proportion of O-17 isotope could be above the natural O0-17 isotopic proportion of 0.038 atom % found on the earth.

In any of the optical waveguides this invention O-17 can be depleted in the core or cladding from the natural O-17 isotopic proportion of 0.038 atom % found on earth. Additionally there may be Si-29 isotope in the core or cladding, or both, in natural or non-natural proportion.

The optical waveguides of this invention can be designed so that the difference in index of refraction between the core and cladding regions is maintained, in full or in part, by a difference of isotopic proportions of Si-29 in silicon, or by a difference of isotopic proportions of Ge-73 in germanium, of greater than 0.001 atom %.

In any optical waveguide of this invention —OH may be reduced by means of a deuterium rinse as has been described in Patent Abstracts of Japan, JP-A-60090845.

In any optical waveguide of this invention, the index of refraction of the cladding may be reduced with a fluorine compound. In addition, the isotopic proportion of Si-30 or O-18, or both, may be greater than that of nature in the core or the cladding or both.

This invention is also an optically-transmissive material, primarily made of silica or germania or both, that has been isotopically modified to as to contain less than 4.44 atom % of Si-29 atoms, or less than 7.41 atom % of Ge-73 atoms, or greater than 4.90 atom % of Si-29 atoms, or greater than 8.18 atom % of Ge-73 atoms.

In any of the optical waveguides of this invention, the cladding or cladding layers may be doped with an isotope-modified sampling of germanium atoms, or the innermost cladding layer may be so modified, such that the isotope distribution of the germanium atoms present has been reduced in Ge-73 isotope to at most 7.2 atom %. Preferably the amount of germanium dioxide is in the range of 0.005% to 1 percent by weight; more preferably from about 0.1% to about 0.5% by weight; and most preferably about 0.1% to about 0.3% by weight.

The instant has been described with reference to particular embodiments. However, it should be obvious to those skilled in the art to which this invention pertains that other modifications and enhancements can be made without departing from the spirit and scope of the claims that follow.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An optical waveguide comprising:
   a) a cladding layer of first high-purity optical glass; said first high-purity optical glass comprising one of silica, germania and a mixture of silica and germania; said first high purity optical glass having a first index of refraction;
   b) a core region of second high-purity optical glass; said second high-purity optical glass comprising one of silica, germania and a mixture of silica and germania; said second high purity optical glass having a second index of refraction;
   the atom percentage of Si-29 to all other Si isotopes in said silica being one of:
   more than 0 and less than 4.44; and
   more than 4.90 and less than or equal to 100;
   the atom percentage of Ge-73 to all other Ge isotopes in said germania being one of:
   more than 0 and less than 7.41; and
   more than 8.18 and less than or equal to 100.

2. The waveguide of claim 1 in which the atom percentage of O-17 to all other O isotopes in one of silica, germania and a mixture of silica and germania being one of:
   more than 0 and less than 0.038; and
   more than 0.038 and less than or equal to 100.

3. The waveguide of claim 1 in which said first index of refraction is higher than said second index of refraction.

4. The waveguide of claim 1, in which at least 10% of oxygen atoms in said silica are oxygen-18.

5. The waveguide of claim 1 in which at least 50 mole percent of oxygen in said core region is oxygen-18 and less than 5 atom percent of oxygen in said core region is oxygen-17.

6. The waveguide of claim 1 in which at least 50 mole percent of oxygen in said cladding region is oxygen-18 and less than 5 atom percent of oxygen in said cladding region is oxygen-17.

7. The waveguide of claim 1 in which at least 70 atom percent of oxygen in said core region is oxygen-18 and less than 5 atom percent of oxygen in said core region is oxygen-17.

8. The waveguide of claim 1 in which at least 70 atom percent of oxygen in said cladding region is oxygen-18 and less than 5 atom percent of oxygen in said cladding region is oxygen-17.

9. The optical waveguide of claim 1 in which said cladding region further comprises a dopant.

10. The optical waveguide of claim 1 in which said core region further comprises a dopant.

11. The optical waveguide of claim 8 or 9, in which said dopant is selected from the group consisting of germanium in natural isotope distribution, germanium in non-natural isotope distribution, silicon-29, phosphorus, silicon-29 and mixtures thereof.

12. The optical waveguide of claim 1 in which the volume percent of the region containing silica containing less than 4.67 atom percent Si-29 is less than 50.

13. The optical waveguide of claim 1 in which the volume percent of the region containing germania containing less than 7.8 atom percent Ge-73, is less than 50.

14. The optical waveguide of claim 1 wherein said indices of refraction change radially.

15. The optical waveguide of claim 1 further comprising an external layer surrounding said cladding layer.

16. The optical waveguide of claim 14 in which said external layer is comprised of a substance selected from the group comprising glass and plastic.

17. The optical waveguide of claim 1 in which hydroxyl concentration in said first and second high purity optical glasses is reduced.

18. The optical waveguide of claim 16 in which reduction of hydroxyl has been accomplished by means of a deuterium rinse.

19. The optical waveguide as claimed in claim 1 in which said first high-purity glass further comprises a fluorine containing compound whereby said first index of refraction is further reduced.

20. The optical waveguide as claimed in claim 1 in which said cladding region further comprises 0.005 to 1% by weight germanium dioxide.

21. The optical waveguide as claimed in claim 1 in which said cladding region further comprises 0.1 to 0.5% by weight germanium dioxide.

22. The optical waveguide as claimed in claim 1 in which said cladding region further comprises 0.1 to 0.3% by weight germanium dioxide.

23. An optically transmissive material comprising:
   silica and germania and a mixture of silica and germania;
   the atom percentage of Si-29 to all other Si isotopes in said silica being one of:
   more than 0 and less than 4.44; and
   more than 4.90 and less than or equal to 100;
   the atom percentage of Ge-73 to all other Ge isotopes in said germania being one of:
   more than 0 and less than 7.41; and
   more than 8.18 and less than or equal to 100.

24. An optically transmissive material as claimed in claim 23 in which the atom percentage of O-17 to all other O isotopes in one of silica, germania and a mixture of silica and germania being one of:
   more than 0 and less than 0.038; and
   more than 0.038 and less than or equal to 100.

* * * * *